L. W. BUGBEE.
BIFOCAL LENS.
APPLICATION FILED NOV. 24, 1917.
1,397,920.
Patented Nov. 22, 1921.
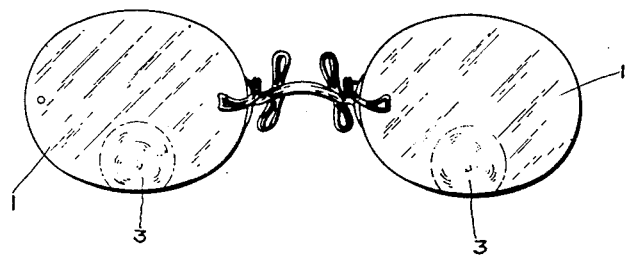
FIG. I
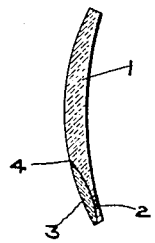
FIG. II
INVENTOR
LUCIAN W. BUGBEE
BY
H. H. Styll & H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BIFOCAL LENS.

1,397,920.  Specification of Letters Patent.  Patented Nov. 22, 1921.

Application filed November 24, 1917. Serial No. 203,833.

*To all whom it may concern:*

Be it known that I, LUCIAN W. BUGBEE, a citizen of the United States, residing at Southbridge, in the county of Worcester and State of Massachusetts, have invented certain new and useful Improvements in Bifocal Lenses, of which the following is a specification.

My invention relates to improvements in lenses, and has particular reference to a novel and improved construction of bifocal lens.

The leading object of my present invention is the provision of a lens of the bifocal type which may be ground with smooth continuous surfaces on both faces thereof, and which when so ground will possess a portion suitable for near vision and a second portion suitable for use for distant vision, these portions being secured by the proper joining together of two pieces of glass of different refractive indices, and which lens will at the same time be entirely free from chromatic difficulties, such as are experienced at the present time in connection with the ordinary or commercial two-part merged surface bifocal.

Other objects and advantages of my improved construction should be readily apparent by reference to the following specification, and it will be understood that while I have illustrated one particular form of using the same, that I may vary the details of construction or application of my invention within the scope of the appended claims without departing from or exceeding the spirit of my invention.

Figure I represents a front view of a mounting fitted with my improved lenses.

Fig. II represents a vertical sectional view thereof.

I am aware that in the past bifocals of both fused and cemented types have previously been manufactured, which similar to the lenses forming the subject matter of my improvement, comprise a major portion or blank 1 having a countersink 2 formed therein to receive the segment or wafer 3, which was suitably secured in the countersink and tapered to a feather-edge as at 4.

Among the defects experienced, however, in connection with these lenses in the past, and one which prior to my invention has been deemed a necessary and inherent defect, counterbalanced only by the other meritorious features of the lens, has been the fact that the major portion 1 of the lens is formed from a glass having a low refractive index and as a corollary a low relative dispersion, while the segment was formed from a different glass having both a high refractive index and a high relative dispersion. As a result of this combination when the combined lens was formed chromatic difficulties would be experienced through the entire segment and especially through the thin or edge portions thereof, as at 4, due to the fact that the segment with its high refractive index and high relative dispersion would cause a greater chromatic effect on the rays of light than could be counteracted by the contra-generic opposed surfaces of the major portion with its low refractive index and attendant low relative dispersion.

Therefore, while the lens in its completed form would present a very neat and attractive appearance, and on account of the difference in the refractive index of the two glasses would give the desired reading addition to the segment, this addition would be accompanied by the chromatic difficulties previously referred to.

The essence of my invention, therefore, consists in the so modifying of the constituent elements of the two glasses employed in the manufacture of the lens, that the major portion 1 shall possess at once a low refractive index and at the same time have the property of high relative dispersion, while the segment fitted into the countersink in the major portion of the lens shall possess as before the property of high refractive index and at the same time have a low relative dispersion. The result of this combination will be that the high relative dispersion of the low refractive index glass will counteract the relatively low relative dispersion of the high index glass to the end that these two will neutralize each other and the lens in place of presenting chromatic troubles and color bands will be substantially achromatic and free from all color objections and difficulties.

Therefore, what I claim as new is:

1. A bifocal lens comprising a major portion of low refractive index and high relative dispersion, having a countersink formed therein and a segment secured within the countersink and having a high refractive index and a low relative dispersion.

2. In a lens, the combination with a main or distance vision portion, of low refractive index, but high relative dispersion, said major portion having a recess formed therein, of a segment fitting the recess and merging with the outer surface of the lens, said segment having a high refractive index but a low relative dispersion and the relationship between the relative dispersion of the two overlying parts and of their refractive indexes and engaging curves being such that the segment will through its higher refractive index, increase the power of the lens while the relative dispersion of the two glasses will tend to neutralize each other and render the lens achromatic, eliminating color difficulties.

In testimony whereof I have affixed my signature in presence of two witnesses.

LUCIAN W. BUGBEE.

Witnesses:
HARRY H. STYLL,
H. K. PARSONS.